United States Patent [19]
Donche et al.

[11] 3,725,394
[45] Apr. 3, 1973

[54] METHYLENE-DITHIOLANS

[75] Inventors: Alain Donche, Lescar; Claude Thibault, Pau; Emmanuel Arretz, Pau; Alain Pfister, Pau, all of France

[73] Assignee: Societe Nationale des Petroles D'Aquitaine, Courbevoie, France

[22] Filed: June 23, 1969

[21] Appl. No.: 835,772

[30] Foreign Application Priority Data

June 25, 1968 France..............................68156451

[52] U.S. Cl. ................260/240 F, 23/117, 23/206, 148/13.1
[51] Int. Cl. .............................................C07d 71/00
[58] Field of Search ..........260/240 D, 240 F, 327 M

[56] References Cited

UNITED STATES PATENTS

| | | | |
|---|---|---|---|
| 3,555,045 | 1/1971 | Griffith et al.......................260/340.9 |
| 3,564,013 | 2/1971 | Walsh..............................260/327 M |
| 3,211,748 | 10/1965 | Wizinger et al...................260/240 X |

OTHER PUBLICATIONS

Chemical Abstracts, Vol. 60, Col. 15853 (1964) (abstract of Jentzsch et al.).
Mayer et al., Angew. Chem. Internat. Edit. Vol. 1, pages 217 to 218 (1962).
Wizinger et al. I. Chimia Vol. 12, pages 79–81 (1956).
Soder et al., Helv. Chim. Acta Vol. 42, pages 1,779–1,782 and 1,784–1785 (1959).
Kirmse et al., Annalen der Chemie, Vol. 614, pages 1 to 17 (1958).
Condo et al., J. Am. Chem. Soc. Vol. 59, pages 230 to 232 (1937).
Hauben-Weyl, Methoden der Organischen Chemie, 4th Ed., Band IX, pp. 762 to 763, Georg Thieme Verlag, Stuttgart, Germany (1955).

*Primary Examiner*—John D. Randolph
*Attorney*—Norman S. Blodgett

[57] ABSTRACT

The present invention relates to the preparation of methylene-dithiolans able to carry various substitutions on their carbons and more especially on the carbon connected by the double methylenic bond to that of position 2.

Dithiolans are heterocyclic compounds containing 2 atoms of sulphur in a cycle having 5 elements. These substances are useful as sulphurants, for example, for the progressive and controlled sulphuration of metals or other materials. Methylene-dithiolans can, moreover, give rise to various interesting reactions, thanks to their double bond between the carbon in position 2 and a carbon exterior to the cycle.

9 Claims, No Drawings

METHYLENE-DITHIOLANS

The present invention permits methylene-dithiolans to be obtained conveniently and economically from easily accessible primary materials.

The new process consists in making a α-dithiol react with a nitrile possessing at α a methylenic group.

Preferably, the reaction is catalysed by an organic basic substance, notably an amine, especially aliphatic tertiary amines, preferably $C_2$ to $C_6$; the use of amines such as triethylamine, tripropylamine, tributylamines or trihexylamines is very practical.

Although the temperature of the operation can vary according to the nature of the particular dithiols and nitriles that are to be condensed, it is generally comprised between 100° and 250° C. The temperatures most used, with aliphatic dithiols, are of the order of 130° to 180° C, and more especially 140° to 160° C; they are preferably from 170° to 220° C for the aromatic dithiols.

The α-dithiol, used in accordance with the invention, carries its two groups —SH on two neighboring carbons of a chain or of a hydrocarbonaceous cycle, possibly substituted. When the dithiol comprises an aliphatic chain, the number of carbon atoms in this chain can very widely, for example, from two up to 30, but it is most often from two to 12. Thus, for example, the invention can be realized from dithiols such as ethane-dithiol-1.2, propane-dithiol-1.2, butane-dithiol-2.3, butane-dithiol-1.2, pentane-dithiol-2.3, octane-dithiol-3.4, phenyl-1-propane-dithiol-1.2, cyclo-hexyl-1-butane-dithiol-2.3, etc. In the case of the cyclic alpha-dithiols, their cycle or cycles — aromatic or cycloaliphatic — can have a greater or lesser number of carbon atoms, most often from five to 14, without counting the radicals of substitution which the cycle can carry. The invention can be put into operation with α-dithiols such as, for example, those of phenylene-$C_6H_4(SH)_2$, cyclohexylene-$C_6H_{10}(SH)_2$, cyclopentylene $C_5H_8(SH)_2$, naphthylene $C_{10}H_6(SH)_2$, or the like, possibly carrying substitutions, especially of alkyls having one to 18 carbon atoms.

As far as the nitriles are concerned, they correspond with the general formula $R-CH_2-CN$, in which the radical R can be aliphatic, cycloaliphatic, arylic, possibly substituted. Thus, R can be akyl, alkenyl, aryl, alkaryl, aralkyl, arylene, cycloalkyl or the like. Most often this radical contains one to 16 carbon atoms; it can, for example, be methyl, ethyl, propyl, propenyl, butyl, butenyl, heptyl, heptenyl, phenyl, methyl-phenyl, diethy-phenyl, chloro-phenyl, naphthyl, cyclopentyl, cyclohexyl, etc.

Although the reaction can take place in the presence of a solvent, the use of this latter is not necessary, and excellent results are obtained by direct heating of a nitrile with the dithiol chosen, this latter being able to be in excess in relation to the stoichiometric proportion corresponding to the equations given further on ( I and II ).

Without prejudging the mechanism of the reaction, one can illustrate the preparation in accordance with the invention by the following equations.

I
$$R-CH_2-CN + HS-CH_2-CH_2-SH- \longrightarrow$$

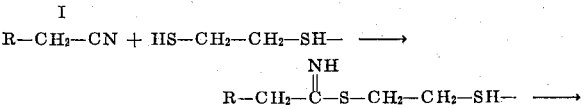

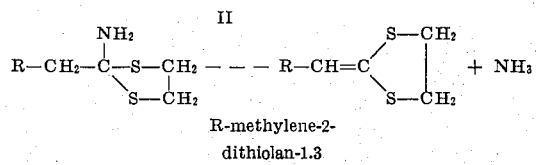

R-methylene-2-dithiolan-1.3

This illustration correspknds to the most simple case where the starting dithiol is ethane-dithiol, the reaction is analogous with other dithiols.

When one or both carbon atoms in positions 4 and 5 of the dithiolan carry substituents, the preparation generally leads to a mixture of isomers. In fact

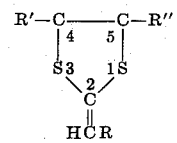

can be presented in the form of two isomers, that is to say, R in cis in relation to R' or even in relation to R", For example, when R' is a $CH_3$, R" being a hydrogen, and the radical R a phenyl, the methyl-4-benzylidene-2-dithiolan-1.3, is presented in the form of two isomers; in the one $C_6H_5$ is in cis with the methyl, in the other, it is in trans.

The non-restrictive examples which follow illustrate the invention.

EXAMPLE 1

One heats for 8 hours at 150° C a mixture composed of:
- 94 g, or 1 mol of ethanedithiol,
- 58.5 g, i.e. 0.5 mol of cyanide of benzyl,
- 0.2 g of triethylamine as catalyst.

The raw product obtained is distilled; the fraction passing at 140° C under 0.2 mm of mercury is then filtered over a column of alumina, the washing agent being composed of ether of pertoleum, containing 10 percent of ethylic ether. After evaporation of the washing agent one collects 60 g of benzylidene-2-dithiolan-1.3, which crystallizes; that represents a yield of 62 percent in relation to the cyanide of benzyl. This compound melts at 44° C.

EXAMPLE 2

The treated mixture is composed of:
- 32.4 g (0.3 mol) of propane-dithiol-1.2,
- 35.1 g (0.3 mol) of cyanide of benzyl (phenylacetonitrile),
- 0.1 g of triethylamine.

The heating lasts 8 hours at 160°C.

At the end of the operation, the raw product is distilled and one collects the fraction passing from 145° C to 148° C under 0.2 mm of mercury. This fraction is filtered over a column of alumina, then washed with the same solvent as in Example 1, and finally redistilled.

The product thus obtained is a mixture of two isomers of methyl-4-benzylidene-2-dithiolan-1.3 liquid. The weight of this mixture is 26.2 g, or a yield of 42 percent.

EXAMPLE 3

One heats for 16 hours at 160° C a mixture composed of:
- 37.6 g or 0.4 mol of ethanedithiol,
- 26.2 g or 0.2 mol of o-tolylacetonitrile,
- 0.1 g of triethylamine.

The raw product obtained is washed with 20 percent soda, in order to eliminate the excess of ethanedithiol. It is then distilled; the fraction passing at 132°–133° C, under 0.15 mm of mercury, is filtered over a column of basic alumina, the washing agent is composed of ether and of ether of petroleum (1/4). After evaporation of the solvent, one collects 22.9 g of o-xylidene-2-dithiolan-1.3, or a yield of 55 percent in relation to the o-tolylacetonitrile.

EXAMPLE 4

A mixture composed of:
37.6 g (0.4 mol) of ethanedithiol,
30.3 g (0.2 mol) of cyanide of o-chlorobenzyl
0.1 g of triethylamine.
is heated for 7 hours at 170° C. The raw product is treated with soda to eliminate the excess of ethanedithiol and it is distilled, the fraction passing at 140° C, under 0.15 mm of mercury, is then filtered over a column of basic alumina; the washing agent is a mixture of 1 part of ether with 4 parts of ether of pertoleum.

After evaporation of the solvent, one collects 28.5 g of o-chloro-benzylidene-2-dithiolan-1.3, which represents a yield of 62 percent in relation to the nitrile.

EXAMPLE 5

One heats for 8 hours at 165° C a mixture composed of:
18.8 g = 0.2 mol of ethanedithiol,
15.1 g = 0.1 mol of cyanide of p-chloro-benzyl,
50 mg of triethylamine.

The raw product is distilled at the end of the reaction; the fraction passing at 146° C under 0.15 mm of mercury crystallizes. This compound melts at 104°–105° C; one collects 14.6 g, or a yield of 67 percent in p-chlorobenzylidene-2-dithiolan-1.3.

EXAMPLE 6

The mode of operation is the same as in Example 3, but one starts with 0.2 mol (26.2 g) of m-tolylacetonitrile. One then obtains m-xylidene-2-dithiolan-1.3, with a yield of 50 percent. The product obtained is a liquid.

EXAMPLE 7

In Example 3, the ortho-tolyl-acetonitrile is replaced by 0.2 mol of para-tolyl-acetonitrile. The body obtained, with a yield of 60 percent, is para-xylidene-2-dithiolan-1.3, whose point of fusion is 50° C.

EXAMPLE 8

The mode of operation is that of Example 4, except that the cyanide of ortho-chlorobenzyl is replaced by its para isomer. With a yield of 67 percent, one then obtains para-chlorobenzylidene-2-dithiolan-1.2, with a fusion point of 104° C.

EXAMPLE 9

In a laboratory autoclave one heats at 200° C, for 2 hours, a mixture of:
0.1 mol (11.72 g) of cyanide of benzyl, that is to say, phenyl-acetonitrile,
0.1 mol (15.62 g) of tolylene-dithiol-3.4, $CH_3$-$C_6H_3$($SH$)$_2$ and
0.5 g of tributylamine.

The product obtained is solid; one recrystallizes it in a mixture of ether of petroleum with benzene, and one obtains with a practically quantitative yield - methyl-5-benzylidene-2-benzodithiolan-1.3 of the formula:

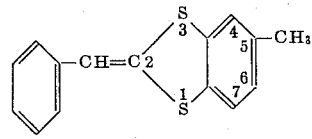

its point of fusion is 132° C.

EXAMPLE 10

Operating as in Example 9, one replaces the phenyl-acetonitrile by 0.1 mol (13.1 g) of para-tolyl-acetonitrile. One likewise obtains with an almost quantitative yield, methyl-5-(p-xylidene)-2-benzodithiolan-1.3, which melts at 140° C, after recrystallization in the mixture of ether of petroleum and benzene.

EXAMPLE 11

The operations are the same as in Example 9 and 10, but the nitrile used is parachlorophenyl-acetonitrile (cyanide of parachlorobenzyl), taken in the same proportion of 0.1 mol (15.15 g).

One then obtains methyl-5-(p-chlorobenzylidene)-2-benzodithiolan-1.3, which melts at 184° C after recrystallization in benzene. The formula of this body is similar to that of Example 9, except that the benzenic nucleus of the benzylidene ( left of the carbon at 2 ) carries one atom of chlorine in para of the group —CH=.

The structure of this compound, just as that of the products obtained in Example 9 and 10, has been confirmed by analysis and spectrography IR, UV and RMN.

We claim:

1. A process for the preparation of methylene dithiolane having a double bond between the carbon atom in position 2 of the dithiolane ring and a carbon atom exterior to the ring, which consists essentially in heating at a temperature in the range from 100 to 250°C. an alpha-dithiol selected from the group consisting of $C_2$–$C_{30}$ alkane dithiols, $C_5$–$C_{14}$ arylene dithiols, $C_5$–$C_{14}$ cycloalkane dithiols, $C_1$–$C_{18}$ alkyl substituted $C_5$–$C_{14}$ arylene dithiols and $C_1$–$C_{18}$ alkyl substituted $C_5$–$C_{14}$ cycloalkane dithiols with a nitrile of formula R–$CH_2$–CN wherein R is a $C_1$–$C_{16}$ alkyl, alkenyl, aryl, alkaryl, aralkyl, arylene, cycloalkyl group, in the presence of an amine.

2. A process according to claim 1, wherein the amine is a $C_2$–$C_6$ tertiary aliphatic amine.

3. A process according to claim 1, wherein the reaction temperature is 130° to 180°C. for the alkane dithiols.

4. A process according to claim 1, wherein the reaction temperature is from 170° to 220°C. for the arylene dithiols.

5. A process according to claim 1, wherein said alpha-dithiol is derived from a member of the group consisting of a $C_2$–$C_{12}$ alkane 1,2-dithiol, $C_2$–$C_{12}$ alkane 2,3-dithiol, and a $C_2$–$C_{12}$ alkane 3,4-dithiol.

6. A process according to claim 1, wherein said alpha-dithiol is derived from a member of the group consisting of $C_2$–$C_{12}$ alkane substituted $C_5$–$C_{14}$ cycloalkane and $C_2$–$C_{14}$ alkane substituted $C_5$–$C_{14}$ arylene dithiols.

7. A process according to claim 1, wherein the nitrile is an aryl-acetonitrile.

8. A process according to claim 7, wherein the aryl is selected from the group consisting of phenyl, halogen substituted phenyl, tolyl, and xylyl.

9. 5-methyl 2-arylidene 1,3-benzodithiolane, wherein the arylidene group is benzylidene, chlorobenzylidene, or xylidene.

\* \* \* \* \*